United States Patent
Ageev

(10) Patent No.: US 12,326,908 B2
(45) Date of Patent: Jun. 10, 2025

(54) AI-DRIVEN SOFTWARE SERVICES ADAPTATION

(71) Applicant: KYOCERA Document Solutions Inc., Osaka (JP)

(72) Inventor: Yury Ageev, Pleasant Hill, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/515,675

(22) Filed: Nov. 21, 2023

(65) Prior Publication Data
US 2025/0165538 A1    May 22, 2025

(51) Int. Cl.
*G06F 16/93* (2019.01)
*G06F 9/50* (2006.01)

(52) U.S. Cl.
CPC ............ *G06F 16/93* (2019.01); *G06F 9/5077* (2013.01)

(58) Field of Classification Search
CPC .............................. G06F 16/93; G06F 9/5077
See application file for complete search history.

(56) References Cited

U.S. PATENT DOCUMENTS

| | | | |
|---|---|---|---|
| 11,720,818 B2* | 8/2023 | Ribera Prat | G06N 3/084 706/12 |
| 11,929,893 B1* | 3/2024 | Kanagovi | H04L 41/507 |
| 2023/0289276 A1* | 9/2023 | Kozhaya | G06F 11/3409 |

FOREIGN PATENT DOCUMENTS

DE    112022002586 T5 *    3/2024    ....... G06F 16/24539

* cited by examiner

*Primary Examiner* — Maher N Algibhah
(74) *Attorney, Agent, or Firm* — W. Eric Webostad

(57) ABSTRACT

Apparatuses and methods relate generally to adaptation. In an apparatus, a document processing system is programmed with document services. A network interface receives user requests for the document services. A machine learning model has nodes and edges and allows the nodes to communicate with one another. A data process node evaluates compression and decompression responsive to first states from the nodes. A processor usage node evaluates processor unit usage of the processor units responsive to second states from the nodes. A storage usage node evaluates storage usage of the data storage responsive to third states from the nodes. A memory usage node evaluates latency response of the system memory responsive to fourth states from the nodes. The machine learning model combines regression models and a distributed gradient-boosting framework to interactively process the states to analyze user requested data to reduce the latency response of the document processing system.

20 Claims, 10 Drawing Sheets

AI-DRIVEN SOFTWARE SERVICES ADAPTATION

FIELD

The following description relates to software services. More particularly, the following description relates to artificial intelligence-driven software services adaptation.

BACKGROUND

More recently, artificial intelligence ("AI") is being used in applications involving many variables. There are real-time problem sets where AI is being used to handle lots of variables to be processed in a short amount of time to provide an immediacy of results, sometimes this is referred to as "real-time processing." Along those lines, it would be useful to use AI for servicing document service requests from multiple users.

SUMMARY

In accordance with one or more below described examples, an apparatus relating generally to controlled adaptation for real-time dynamic performance enhancement is disclosed. In such an apparatus, a document processing system is programmed with document services and has a system memory, a data storage, one or more processor units, and a network interface. The network interface is coupled for receiving user requests for the document services. A machine learning model is configured with a plurality of nodes and edges therebetween for communication of information. The machine learning model is configured to allow each of the plurality of nodes to communicate with any other one or more of the plurality of nodes during operation. A data process node of the plurality of nodes is configured to evaluate compression and decompression among a plurality of algorithms therefor responsive to first states from the plurality of nodes. A processor usage node of the plurality of nodes is configured to evaluate processor unit usage of the one or more processor units responsive to second states from the plurality of nodes. A storage usage node of the plurality of nodes is configured to evaluate storage usage of the data storage responsive to third states from the plurality of nodes. A memory usage node of the plurality of nodes is configured to evaluate latency response of the system memory responsive to fourth states from the plurality of nodes. The machine learning model is configured as a combination of regression models and a distributed gradient-boosting framework to interactively process the first, second, third, and fourth states for regressions and gradient-boosted decisions to analyze user requested data associated with the user requests to reduce the latency response of the system memory for the controlled adaptation for the real-time dynamic performance enhancement of the document services in the document processing system.

In accordance with one or more below described examples, an apparatus relating generally to controlled adaptation for real-time dynamic performance enhancement is disclosed. In such an apparatus, there is a document processing system with a system memory, a data storage, one or more processor units, and a network interface. The system memory is configured to store program code including document services. The network interface is coupled for receiving user requests for the document services. In combination and response to executing the program code, the document processing system is configured to initiate operations for implementing a process for controlled adaptation for real-time dynamic performance enhancement. The process includes communicating between a plurality of nodes via edges of a machine learning model configured with the plurality of nodes and the edges therebetween for communication of information. The communicating includes communication between each of the plurality of nodes with any other one or more of the plurality of nodes. The process further includes: evaluating compression and decompression among a plurality of algorithms responsive to first states from the plurality of nodes by a data process usage node of the plurality of nodes; evaluating processor unit usage of the one or more processor units responsive to second states from the plurality of nodes by a processor usage node; evaluating storage usage of the data storage responsive to third states from the plurality of nodes by a storage usage node; evaluating latency response of the system memory responsive to fourth states from the plurality of nodes by a memory usage node; interactively processing the first, second, third, and fourth states for regressions and gradient-boosted decisions by the machine learning model configured as a combination of regression models and a distributed gradient-boosting framework; and analyzing user requested data associated with the user requests to reduce the latency response of the system memory for the controlled adaptation for the real-time dynamic performance enhancement of the document services in the document processing system.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block-flow diagram depicting an example of a control optimization service architecture ("service architecture").

FIG. 1-3 is a schema network diagram depicting an example of nodes and edges of a metrics service model.

FIG. 2 is a flow diagram depicting an example an artificial intelligence-driven ("AI-driven") software services adaptation flow ("adaptation flow").

FIG. 3-1 is a block-flow diagram depicting an example of an adapted service architecture.

FIG. 3-2 is a block-flow diagram depicting an example of a cluster.

FIG. 3-3 is a block-flow diagram depicting an example of an alert manager in communication with K8s containers for feedback signaling.

DETAILED DESCRIPTION

Figure 1:
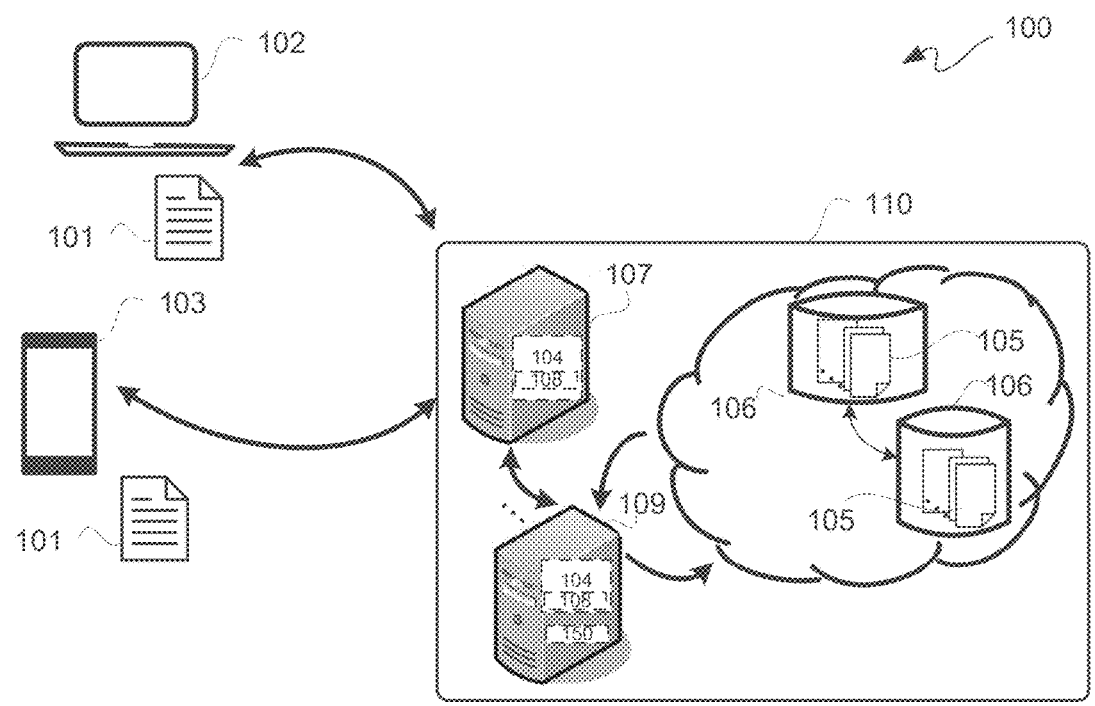
FIG. 1-1 is a block-pictorial diagram depicting an example of cloud-based network having an automated, cloud-based document processing system ("document processing system").

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

There is a trend in the software industry to transition software products into a cloud infrastructure, such as Google Cloud Platform, Azura of Microsoft, and AWS of Amazon, among others. Generally, companies obtain benefits by deploying software in hardware which are maintained by third parties. Cloud providers take responsibility for provision hardware resources responsive to requests from software services which may be in response to user requests. Some hardware and software resources on clouds involve providing predefined performance for proprietary software services of software producers. Cloud hardware resources may include one or more of processor(s) or CPU usage (collectively and singly "CPU usage"), memory usage, and storage usage.

Usages of these hardware resources may reflect the ability of distributed software products to operate in a cloud hosted environment. As described below in additional detail, a characteristic of cloud software products that customers expect to experience a high-quality of service in software operations involves providing a low latency execution value. Generally, the faster service responses to user requests are, the better user experience of a software service is. However, cloud software services may be challenged by latency values of service processing responses to user requests. A cloud infrastructure may provide hardware resources by controlling scalability of cloud resources with either vertical scaling or horizontal scaling. Both scaling strategies allow a scale up or scale down capacity of system resources.

It is important to keep the cloud resource as balanced as possible to avoid excessive charging for resource usage. Whatever strategy a cloud provider applies for provisioning requested resources, resource usages by software services comes at a cost. Cost reduction is a goal in enterprise software services, such as may be associated for example with uses hosted in proprietary cloud environments.

Along those lines, there is an increasing number of documents being processed in enterprise software systems. Automation of document processing can involve intensive system resource usages, including expensive CPU usage and memory usage. As described below in additional detail, optimization resources usages includes a software component that controls real-time data flow processing to reduce resource usages. A dynamic adaptation of software service reacts at a "high level" of requests of data processing, such as for example documents analyzing and documents updating.

As described below in additional detail, various aspects of optimizations for a cloud environment with operational units. These operational units may be euphemistically be thought of as a set of orchestrated web services via software control. As a consequence of optimization in a cloud environment, resources can be scaled more effectively because of optimization of multiple effects from node to node inside of a cloud operation environment, such as for example a Kubernetes cloud operation environment.

Generally, there is tradeoff between latency, namely how fast a service reacts, on the one hand and resource usage, power consumption, or cost on the other hand. As described below in additional detail, adjustment of resources usages according to predefined bounds of acceptable parameters, such as for example maximum allowed latency. However, if overstress or overemphasis is put on just one parameter, such as latency, then from a business perspective costs for example in an eCommerce industry may be too high, and so adjusting the balance of resource utilization may be useful. Furthermore, an operation environment may have various data, as well as types or forms thereof, changing fast in a real time beyond the capability of a human operator to control effectively such a process. As described below in additional detail, a machine learning ("ML") model and regression may be used to manage and control a process in real time without human intervention.

With the above general understanding borne in mind, various configurations for systems, and methods therefor, for real time resource utilization without human intervention thereof are generally described.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a general block-pictorial diagram depicting an example of cloud-based network 100 having an automated, cloud-based document processing system ("document processing system") 110. One or more users, such as smart phones, tablets, notebooks, or other computers may be in communication with a cloud-based document processing system 110 via Internet or Intranet communications for example. In this example, a notebook computer 102 and a smart phone 103 are in two-way communication with a cloud-based document processing system 110. Cloud-based document processing system may include a network interface, data storage, and one or more processors.

For example, server computers 109 may generally provide one or more processors and system memory 104. Each server computer 109 may have multiple processors for CPU usage and multiple memories forming a system memory 104. Server computers 109 may be in communication with data storage, such as for example one or more data stores 106 for storing electronic documents 105. Data stores 106 may be in communication with one another to form a cloud-based data cluster, as generally indicted.

One or more server computers 109, as well as web server 107, may include system memory, as generally indicated as system memory 104. Additionally, one or more of server computers 109 may be programmed with program code, generally indicated as program code 108, as described below in additional detail. System memory 104 may be configured to store program code 108. Program code 108 may be for providing document services, as well as artificial intelligence-driven software services adaptation as described below in additional detail.

A web server 107 may be in communication with one or more server computers 109 for network interfacing with user devices, such as for example notebook computer 102 and smart phone 103. Web server 107 make likewise include program code 108 for providing document services, as well as artificial intelligence-driven software services adaptation as described below in additional detail.

Even though program code 108 is generally indicated as being distributed among web server 107 and computer servers 109, such program code may reside mainly in web server 107 for controlling web server 107 operations, including caching in system memory 104 thereof, as well as operations of one or more downstream devices, such as for example computer servers 109. Optionally, computer servers 109 may include a portion of program code 108 for controlling data stores 106 and system memory 104 thereof.

User devices 102 and 103 may be programmed to provide requests for servicing electronic documents 101. These requests, and responses thereto, may be communicated via one or more networks to web server 107 of document processing system 110.

It will be understood from the following description that any of a variety of configurations may be used for providing a document processing system 110 as described herein.

Figures 1, 2:
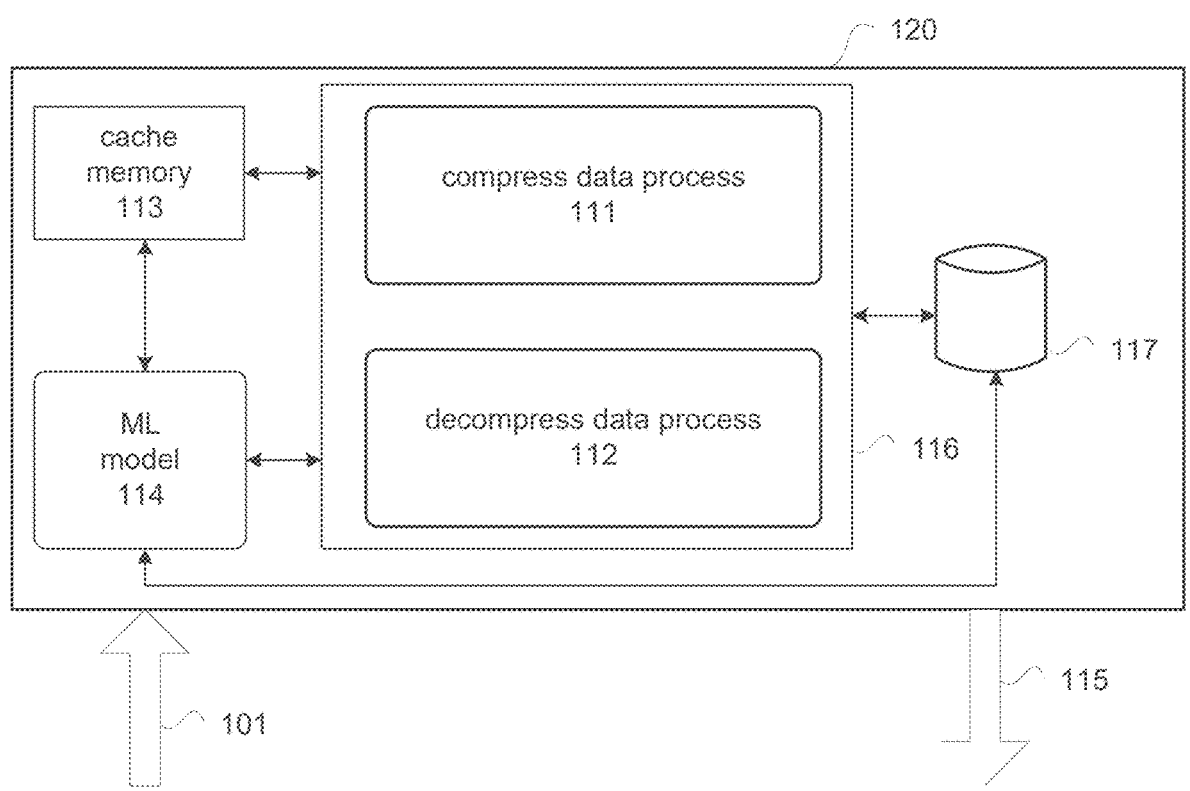

FIG. 1-2 is a block-flow diagram depicting an example of a control optimization service architecture ("service architecture") 120. Service architecture 120 may be configured to receive user requests 101 for collecting data for one or more ML models for training purposes. For example, user requests 101 may be http requests.

Such user requests 101 may be provided to cache memory 113 of service architecture 120. Service architecture 120 may include an ML model 114, cache memory 113, a data processor(s) 116, and data storage 117.

Service architecture 120 may be configured with one or more of different compression algorithms and corresponding decompression algorithms. Along those lines, a data processor 116 may be configured to compress data via a compress data process 111 and to decompress data via a decompress data process 112 of a selected compression algorithm and a corresponding decompression algorithm, respectively. Such compressed data or uncompressed data may be stored in data storage, such as for example a data storage 117, in communication with data processor 116.

An ML model 114 may be in communication with data processor 116 and cache memory 114. Cache memory 114 may generally be thought of as a portion of system memory or a separate memory space or both.

ML model 114 may be trained to understand caching of: compressed or uncompressed data in cache memory 113 and caching of user request data from user requests 101. This may be used to train an ML model 114 in regard to cache memory usage for servicing a document for different types of user requests and different compression or decompression types. Memory cache 113 may have an effect on latency of a document processing system 110, and so an ML model 114 may be part of a workflow for training. Output of service architecture 120 may be a document service 115 in response to a user request 101.

A user request 101 may be to store or retrieve a document for example to/from data storage 117. Such a document may be a scanned document, and so a user request might include performing an optical character recognition for example on such a scanned document and then compressing same for storage. This is just one example of a document service, and there are many more known types of document servicing for which ML model 114 may be trained.

Optionally, ML model 114 may be in communication with data storage 117 to understand effects on latency for different user requests by data storage 117, as well as data processor 116 and cache memory 113. Furthermore, different types of data compression may have different types of storage usages and consequently different types of retrieval latencies. Additionally, for a requested document web service, a requesting user may be taken into account in determining an acceptable latency for user experience. As should be understood the number of possible permutations is substantial for web document services.

Figures 1, 2, 3:
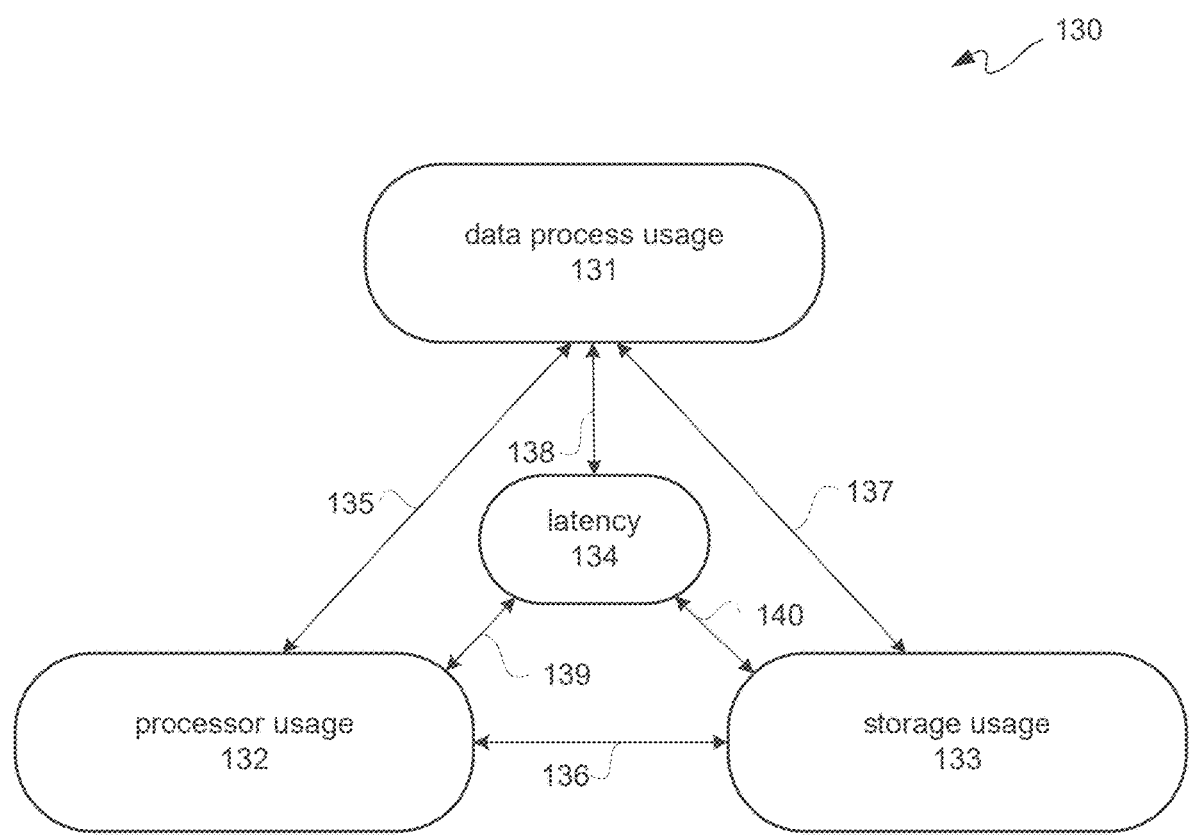
Figure 2:
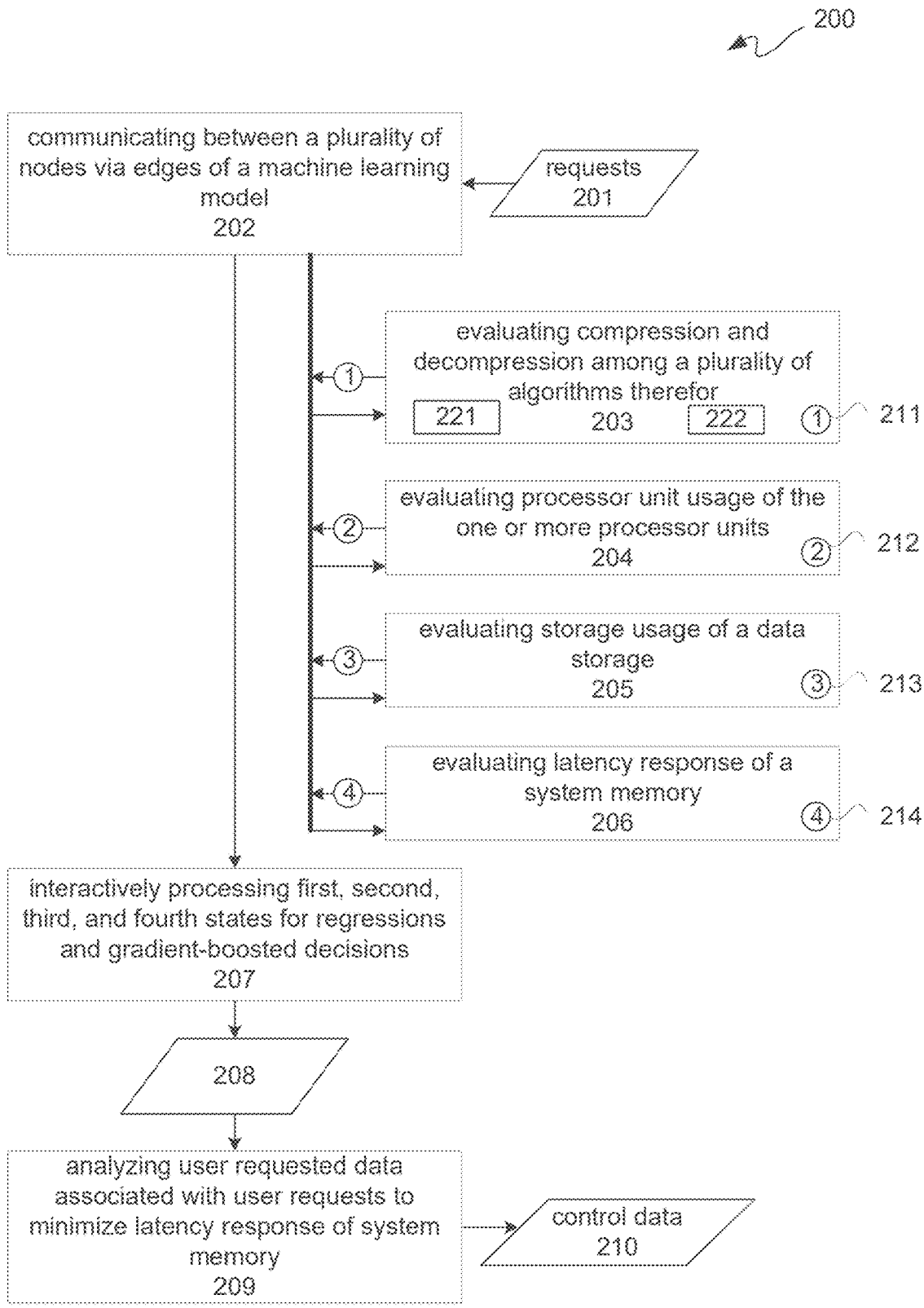
Figures 1, 3:
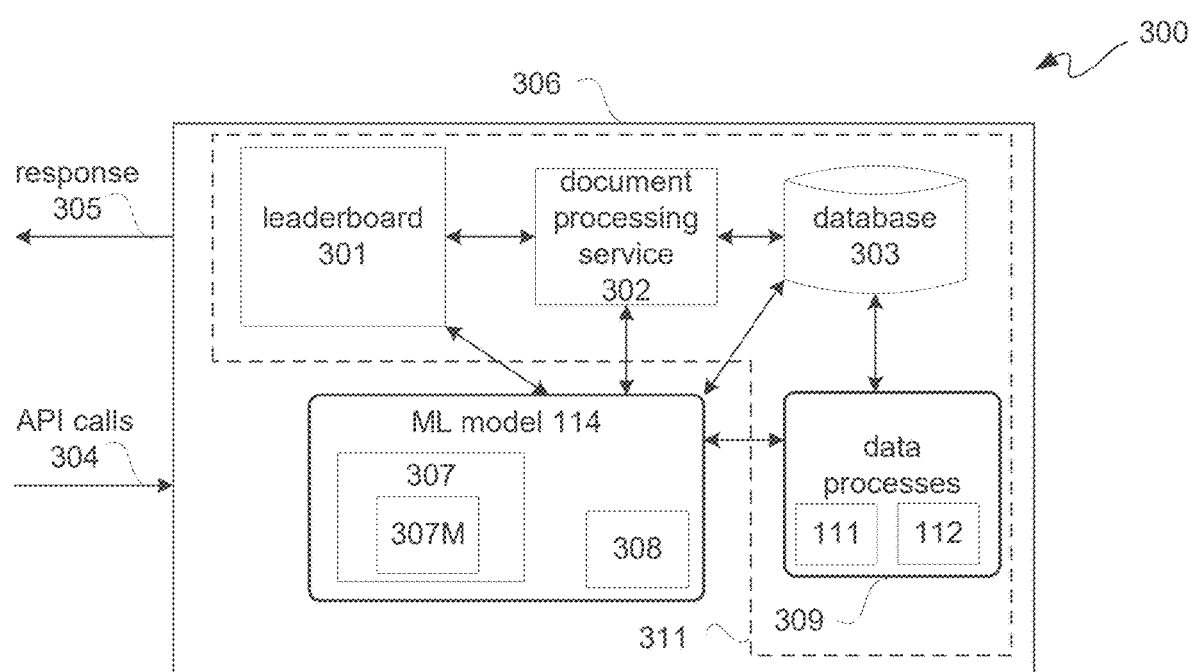
Figures 2, 3:
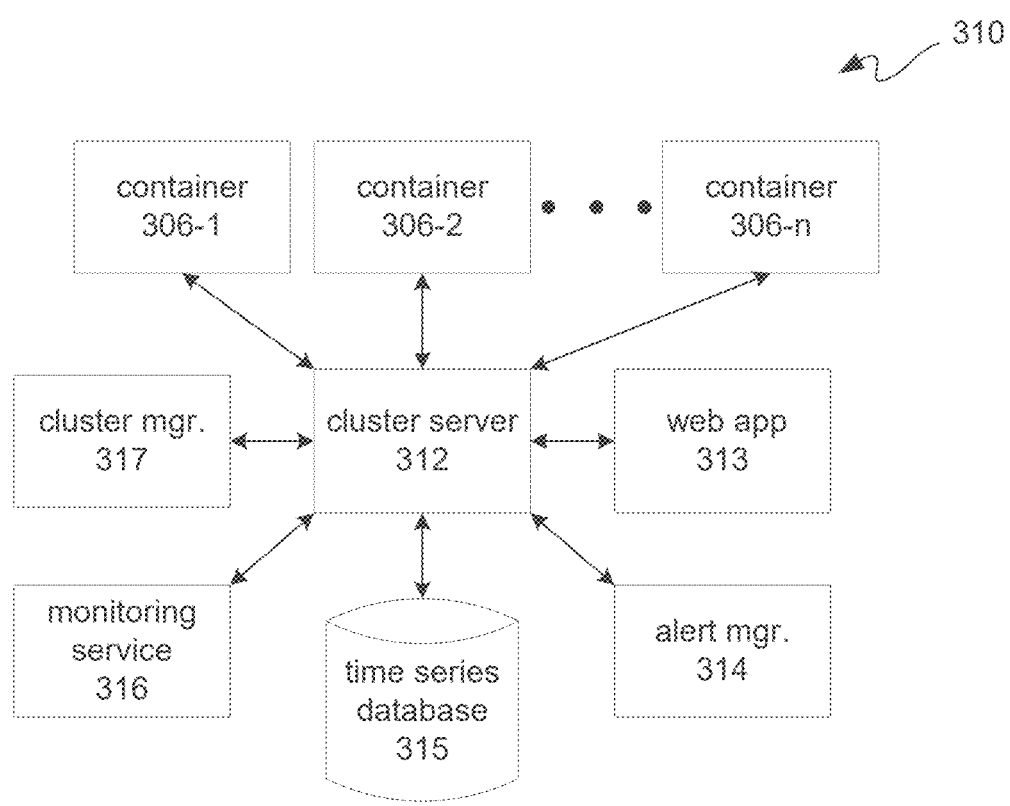
Figure 3:
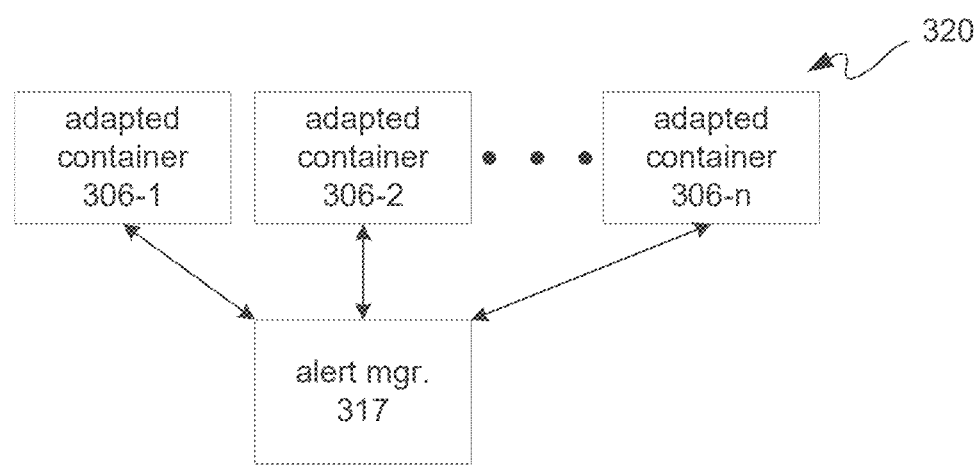

FIG. 1-3 is a schema network diagram depicting an example of nodes and edges of a metrics service model 130. Metrics service model 130 includes a data process usage node ("data process node") 131, a CPU usage node 132, a storage usage node 133, and a latency node 134. Edges 138 through 140 between a central latency node 134 and perimeter nodes 131 through 133, respectively, is for communication of latency information for each of such perimeter nodes to such central node. Latency may be optimized over other optimizations for example. In the above example, data process node 131 was compression and decompression; however, other data processes for document services may be used in this or another example. Additionally, following the above example, latency node 134 may include cache memory operation; storage usage 133 may be for a data store; and CPU usage 132 may be for a server computer.

Edge 135 may communicate process information and corresponding CPU usage between nodes 131 and 132. Edge 136 may communicate CPU usage information and storage usage information 133 between nodes 132 and 133. Edge 137 may communicate data process information and storage usage information between nodes 131 and 133.

This schema network diagram effectively shows mutual dependencies of selected system components. While latency may be a most important value to be taken into account into optimization, but each of these components have associations with measured data collected by metrics service model 130. However, perimeter nodes may have different priorities for optimization depending on application and system constraints.

Data collected by metrics service model 130 may be used to train a prediction ML model, such as ML model 114. ML model 114 may be a system controller, which uses a prediction model for real-time control and to optimize resource usages.

FIG. 2 is a flow diagram depicting an example an artificial intelligence-driven ("AI-driven") software services adaptation flow ("adaptation flow") 200. Adaptation flow 200 may be used with a document processing system, such as for example document processing system 110 of cloud-based network 100 of FIG. 1-1 and an ML model and modeling, such as for example in FIGS. 1-2 and 1-3. Accordingly, for purposes of clarity by way of example and not limitation, adaptation flow 200 is further described with simultaneous reference to FIGS. 1-1, 1-2, 1-3, and 2.

A web server 107 may be coupled for receiving user requests 201 for document services. Program code 108 may configure document processing system 110 to initiate operations for implementing a process for controlled adaptation for real-time dynamic performance enhancement of document processing system 110 for handling such user requests 201.

In response to user requests 201, at operation 202 adaptation flow 200 may communicate between a plurality of nodes 131-134 via edges 135-140 of metrics service model 130, as previously described. Metrics service model 130 may be of ML model 114, and so an ML model 114 may be a machine learning model configured with such plurality of nodes and such edges therebetween for bidirectional communication of information. Information may be bidirectionally communicated between each of such nodes with any other one or more of such nodes. In other words, every node may communicate directly with every other node in such nodal datagram-like network.

Operation 202 may include operations 203 through 206. At operation 203, data compression and decompression algorithms may be evaluated. For example, among a plurality of algorithms for compression 221 and a plurality of algorithms for decompression 222 one or more of latency, processor usage, data storage usage, or other metrics may be generated or measured for subsequent evaluation for each of such algorithms. A set of metrics may be stored as "first" states 211 responsive to each of such algorithms evaluated. Evaluation of metrics may thus be responsive to first states 211 from or among such plurality of nodes, where such first states are generated by or measured at a data process node 131 of such nodes 131-134.

At operation 204, processor usage one or more processor units of document processing system 110 for operation of an algorithm or other operation of such system may be evaluated. For example, among a plurality of algorithms for compression 221 and a plurality of algorithms for decompression 222 one or more of latency, processor usage, data storage usage, or other metrics may be generated or measured for subsequent evaluation for each of such algorithms. A set of metrics may be stored as "second" states 212 responsive to each of such algorithms evaluated. Evaluation of metrics may thus be responsive to second states 212 from or among such plurality of nodes, where such second states are generated by or measured at a processor usage node 132 of such nodes 131-133.

At operation 205, storage usage one or more storage units of document processing system 110 for operation of an algorithm or other operation of such system may be evaluated. For example, among a plurality of algorithms for compression 221 and a plurality of algorithms for decompression 222, a reading of compressed data and a writing back of compressed data to a storage unit 106 may affect one or more of latency, processor usage, data storage usage, or other metrics, which may be generated or measured for subsequent evaluation for each of such operations. A set of metrics may be stored as "third" states 213 responsive to each of such operations evaluated. Evaluation of metrics may thus be responsive to third states 213 from or among such plurality of nodes, where such third states are generated by or measured at a storage usage node 133 of such nodes 131-134.

At operation 206, latency response of one or more units of system memory of document processing system 110 for operation of an algorithm or other operation of such system may be evaluated. For example, among a plurality of algorithms for compression 221 and a plurality of algorithms for decompression 222, a reading of data and a writing data to a system memory 104 may affect one or more of latency, processor usage, data storage usage, or other metrics, which may be generated or measured for subsequent evaluation for each of such operations. A set of metrics may be stored as "fourth" states 214 responsive to each of such operations evaluated. Evaluation of metrics may thus be responsive to fourth states 214 from or among such plurality of nodes, where such fourth states are generated by or measured at a latency node 134 of such nodes 131-134.

Returning to operation 202, nodes 131-134 may communicate with one another for machine learning. Along those lines, at operation 207, first, second, third, and fourth states 211-214 may be interactively processed for regressions and gradient-boosted decisions by a machine learning model configured as a combination of regression models and a distributed gradient-boosting framework, such as ML model 114. Regression outcomes and gradient-boosted decisions may be output as data 208.

At operation 209, user requested data associated with user requests may be analyzed using such data 208 to reduce latency response of document processing system 110. For example, an overall document processing system 110 may be reduced for an operation, such as for example a data compression or decompression algorithm or other operation of document processing system 110. In particular, in some instances overall latency of document processing system 110 may be reduced by minimizing latency of system memory 104. Document processing system 110 may be adjusted responsive to control data 210 output from operation 209 for a controlled adaptation for a real-time dynamic performance enhancement of document services 150, such as programmed in program code 108 for example, in computer servers 109 of document processing system 110.

To recapitulate, a machine learning approach is applied as a combination of regression models and a gradient-boosting framework model as core machine learning algorithms for control optimization of computer resource usages of a document processing system 110. In this example, a LightGBM is used for a gradient-boosting framework, though in another example another type of distributed gradient-boosting framework for machine learning may be used. A schema of an ML model shows mutual dependencies of system components as nodes coupled to one another as edges for purposes of clarity by way of example and not limitation. These components have associations with generated and measured data that are collected by a metrics service, as described below in additional detail. Collected data is used for training a prediction ML model 114, which may be a prediction model for providing control data 210. System control in program code 108 and/or hardware of web server 107 may use such a prediction model for real-time control and to optimize resource usages responsive to control data 210. Examples of such optimizations, or near optimizations within some threshold as a user may determine, may include one or more of decreased memory storage usage, increased data flow processing, reduced CPU usage, reduced system memory usage, or the like. Generally, goals of decreasing latency of system responses are to, as a result thereof: enhance user experience of documents processing.

FIG. 3-1 is a block-flow diagram depicting an example of an adapted service architecture 300. In this example, a container orchestration system ("container") 306 for automating software deployment, scaling, and management is used. For purposes of clarity by way of example and not limitation, in this example a Kubernetes ("K8s") container 306 is used; however, in another example another container orchestration system for automating software deployment, scaling, and management may be used.

In this example, API calls 304 from various apps interfacing to K8s container 306 for various container runtimes, such as for running and managing large cloud-native workloads, are received. K8s container 306 may include ML model 114 coupled for communication with a set of software services 311. In this example such set of software services ("software services") 311 includes in-memory cached documents leaderboard service ("leaderboard") 301, document processing service 302, database service ("database") 303, and data processes service ("data processes") 309. For purposes of clarity by way of example and not limitation, data processes 309 may include data compression process 111 and decompression processes 112, examples of some of which are described below. However, other electronic document services may be used in this example, such as for example document clean-up, document restoration, or other document service.

ML model 114 may include a distributed gradient-boosting framework 307, and such framework 307 may include at least one gradient-boosting machine ("GBM") 307M. In this example, GBM 307M is a LightGBM; however, in another example another type of GBM may be used. As gradient-boosting is a known machine learning technique, it is not described herein in unnecessary detail.

For example, an API call 304 may be received by K8s container 306 for storing a document in database 303. Each API call may be received by ML model 114 for an operating environment. For example, a web service API call may be to provide a service as controlled by ML model 114 in a synchronous manner. ML model 114 in communication with other components of K8s container 306 may inform such components in parallel or synchronously, and which components are informed may depend on a workflow of a requested service. For example, such a document may be cached and logged as cached in system memory 104 and scored as cached in documents leaderboard 301. A memory usage node may include a leaderboard 301 for memory caching control to adjust for latency of system memory responsive to fourth states 214. Documents leaderboard 301 may be a way of scoring or tracking stages of documents being serviced in K8s container 306. Such document may be provided to a document processing service 302, which may involve removing from cache and updating leaderboard 301 accordingly. Document processing service 302 may for example add information for indexing and error correcting such document for storing and compression. Even though compression is used for example, there may be no compression in another example. Furthermore, in another example, document deflation with or without compression may be used. Such document may be directed for compression by a data process 309. Again, documents leaderboard 301 may score each of these operations as in process or completed for example. After compression, such document may be stored in database 303. ML model 114 may obtain metrics for each of these operations about such a document with respect to operations within K8s container 306. A document decompression may be used in another example workflow or another document service. Additionally, for documents processing or servicing involving output of a response 305 from K8s container 306, ML model 114 may determine a response time for each such occurrence.

K8s container 306 may be distributed, or in other words, there may be multiple K8s containers 306 such as for executing multiple workflows in parallel or synchronously for example. For each such workflow in a K8s container 306, dynamic ML model 114 may provide tracking of resource usages inside to bound between over-allocating and misallocating resource each resource value in use. Additionally, ML model 114 may consider various factors, such as resource usage in the past, current workload, and expected future workload. With respect to the latter, ML model 114 may include regression and time series forecasting to predict future resource usage of each contained application based on past usage patterns. Some factors that may affect resource usage are: number of requests per second ("RPS"), number of users, and current load on a K8s cluster. Additionally, a type or hierarchy of user, a user's history, a document's history, or other metric may be a factor. For example, frequency of use of a document may be so high to simply leave such a document cached in system memory; however, it may be determined that just one or two pages of a document have such a high frequency of use so as to just leave those one or two pages cached in system memory.

In short, responsive to an API call, an ML model 114 may provide a response as to how to enhance or optimize operation within an operating environment of a K8s container for a workflow, and a response 305 for same may be output from such K8s container for a K8s cluster in order to provide an overall optimization or enhancement as previously described.

FIG. 3-2 is a block-flow diagram depicting an example of a cluster 310. In this example, a K8s cluster 310 is used; however, in another example a different cluster for a distributed or multi-container cloud-based platform may be used. FIG. 3-2 is further described with simultaneous reference to FIGS. 1-1 through 3-2.

In this example, there are 3 K8s containers 306-1, 306-2 and 306-$n$ for n equal to 3. However, in another example the value of n may be a positive integer greater than 3. Furthermore, in another example, just one or two K8s containers may be implemented for a cluster. Each K8s container 306 generates a response for a workflow process in a runtime environment therein for optimization or enhancement of same. Accordingly, responses 305 from each K8s container 306 may be provided to a cluster server 312. Cluster server 312 may be configured for communication with each of K8s containers 306 in K8s cluster 310, as well as of components 313-317 of K8s cluster 310.

Generally, document processing system 110 may be programmed with software services 311 for providing various document services. K8s cluster 310 may generally be thought of as having multiple sets of software services within each K8s containers 306 with each controlled by an ML model. Each of such software services 311 may be configured by an ML model 114 to control real-time data flow processing for document processing system 110 for handling of user requests. Such ML model 114 may be configured to reduce resource usages, such as of data storage and one or more processor units subject to a reduction of a latency response.

Software services 311 may react to user requests for data processing to analyze and update requested documents categorization. Along those lines, as previously described, ML model 114 and document services 311 are in communication with one another in a container runtime configured to respond incoming API calls. Effectively, ML model 114 is distributed among multiple container runtimes within a cluster 310 by cluster server 312.

A combination of regression models and a distributed gradient-boosting framework may be for example a LightGBM selected using automated ML or AutoML. Regressions and gradient-boosted decisions may be automatically analyzed for user requested data associated with a user request to reduce latency response of system memory 104 for a controlled adaptation for real-time dynamic performance enhancement of document services to automate document processing system 110.

Real-time adapted software architecture uses a monitoring service 316, a data collector (such as a time series database 315), a cluster manager 317, and an alert manager 314, and all of these may be in communication with for control and coordination by cluster server 312. Additionally, for interactive visualization, analytics and interactive visualization web application 313 may be used and may be in communication with for control and coordination by cluster server 312. For purposes of clarity by way of example and not limitation, Grafana 313 may be used herein; however, other analytics and interactive visualization web apps may be used herein.

Monitoring service 316 may be responsible for continuously monitor resource usage. Time series database 315 may be configured to store historical data on resource usage for each applications container in cluster 310. Cluster manager 317 may be configured to react on predictions to adjust resource allocation for each container 306, and to trigger horizontal or vertical scaling of containers 306 when applicable.

Alert manager 314 may provide custom notification by using a web hook integration that allows defining of a custom notification channel. Containers 306, which effectively may be adapted or adaptive containers 306, may contain custom handlers to receive alerts for data processing. Alert manager 314 may be part of workflow execution infrastructure, such as to provide feedback to control optimal behavior for an adapted environment of web services. As a part of monitoring infrastructure, alert manager 314 may operate in real time and react with immediacy as or in response to a changing execution environment. This feedback signaling from alert manager 314 allows operational services be adaptive under a changing environment, such as addition of more users, more incoming requests, or other factors increasing workload. Such adapting allows for cluster 310 to be more robust and to keep latency response as expected according to system parameters.

Alert manager 314 can be configured to provide notifications based on workload fluctuations in services. For example, during low-demand periods like nighttime, when workload decreases significantly, alert manager 314 can generate notifications to inform relevant stakeholders about a changed operational environment. These notifications can serve as triggers for proactive actions or adjustments to optimize resource allocation, such as scaling down or reconfiguring infrastructure components.

Conversely, during high-demand periods when services are under heavy load, alert manager 314 can be set to trigger events when certain maximum values or thresholds are exceeded. This allows monitoring teams to promptly identify and address any potential performance or capacity issues. Triggered events can initiate response actions, such as scaling up resources, optimizing query performance, or load balancing, to ensure optimal or at least enhanced service levels are maintained, as well as to prevent any disruptions or performance degradation. By leveraging alert manager's notification capabilities in this manner, workflow of data processing can maintain operational efficiency and ensure resource utilization aligns with workload demands. Furthermore, such notifications allow for proactive monitoring and management, optimizing costs during low-demand periods while ensuring performance and availability during high-demand periods.

Using AutoML, namely a set of technologies and algorithms for automated machine learning, AutoML algorithms may automate a process of machine learning time-consuming tasks. AutoML algorithms may: automatically search and evaluate a wide set of machine learning models and algorithms; evaluate various models such as decision trees, support vector machines, random forests, or neural networks. An AutoML process changes configurations as the number of layers, learning rates, or regularization parameters change. As a result, AutoML may help to identify the most suitable model for a dataset.

In this example, a LightGBM regression algorithm is selected by using AutoML automation. LightGBM is designed to handle large datasets and has several optimizations that make it faster than other gradient boosting implementations. LightGBM uses a decision tree ensemble model, where each tree is built sequentially and tries to correct the mistakes made by previous trees. The algorithm focuses on building shallow trees and uses a leaf-wise growth strategy, which means it chooses the leaf node that achieves the maximum reduction in the loss function while growing the tree. This approach allows for faster training times and lower memory usage compared to other gradient boosting implementations.

LightGBM also incorporates features like parallel and GPU learning, which further enhance its speed and scalability. It supports various loss functions and provides flexibility in hyperparameter tuning, allowing users to customize the model based on their specific needs.

An example of logging data of model training code is as follows: ["MSecLeft", "SizeFile", "TypeFile", "OpCompress", "Users", "CpuUsage", "Latency", "Cost", "CostSum"]}, "e1": {"InputColumnNames": ["MSecLeft", "SizeFile", "TypeFile", "OpCompre ss", "Users", "CpuUsage", "Latency", "Cost", "CostSum"], "OutputColumnName": "Features" }, "e4": {"NumberOfLeaves": 4, "MinimumExampleCountPerLeaf": 23, "LearningRate": 0.3 1730151856531713, "NumberOfTrees": 3495, "SubsampleFraction": 0.99999977667298 65, "Maximum BinCountPerFeature": 406, "FeatureFraction": 0.7206266928597398, "L1R egularization": 2E10, "L2Regularization": 0.9999997766729865, "LabelColumnName": "M emoryUsage", "FeatureColumnName": "Features"}, "e2": {"NumberOfLeaves": 4, "Minimu mExampleCountPerLeaf": 20, "NumberOfTrees": 4, "MaximumBinCountPerFeature": 255, "FeatureFraction": 1, "Learning Rate": 0.09999999999999998, "LabelColumnName": "Me mory-Usage", "FeatureColumnName": "Features"}, "e3": {"NumberOfTrees": 4, "NumberOf Leaves": 4, "FeatureFraction": 1, "LabelColumnName": "MemoryUsage", "FeatureColumn Name": "Features"}, "e5": {"L1 Regularization": 1, "L2Regularization": 1, "LabelColumnNam e": "MemoryUsage", "FeatureColumnName": "Features"}, "e6": {"L1 Regularization": 1, "L2 Regularization": 0.1, "LabelColumnName": "MemoryUsage", "FeatureColumnName": "Fea tures"}}} 2023 Apr. 5 23:35:31.677-07:00 [INF] [Source=AutoMLExperiment, Kind=Info] Update Completed Trial-Id: 35-Metric: 0.9991860493043433-Pipeline: ReplaceMissing Values=>Concatenate=>LightGbm-Regression-Duration: 604-Peak CPU:-Peak Memory in MB: 2023 Apr. 5 23:35:31.677-07:00 [INF] [Source=AutoMLExperiment, Kind=Info] Update Best Trial-Id: 35-Metric: 0.9991860493043433-Pipeline: ReplaceMissing Values=>Concatenate=>LightGbm Regression Different types of compression may have different compression ratios. Here are some examples of compressions and their corresponding ratio, as well as compression and decompression rates:

| Compressor | Ratio | Compression | Decompression |
|---|---|---|---|
| memcpy | 1.000 | 13700 MB/s | 13700 MB/s |
| LZ4 default (v1.9.0) | 2.101 | 780 MB/s | 4970 MB/s |
| LZO 2.09 | 2.108 | 670 MB/s | 860 MB/s |
| QuickLZ 1.5.0 | 2.238 | 575 MB/s | 780 MB/s |
| Snappy 1.1.4 | 2.091 | 565 MB/s | 1950 MB/s |
| Zstandard 1.4.0 -1 | 2.883 | 515 MB/s | 1380 MB/s |
| LZF v3.6 | 2.073 | 415 MB/s | 910 MB/s |
| Zlib deflate 1.2.11-1 | 2.730 | 100 MB/s | 415 MB/s |
| LZ4 HC-9 (v1.9.0) | 2.721 | 41 MB/s | 4900 MB/s |
| Zlib deflate 1.2.11-6 | 3.099 | 36 MB/s | 445 MB/s |

FIG. 3-3 is a block-flow diagram depicting an example of an alert manager 317 in communication with K8s containers 306 for feedback signaling. For purposes of clarity and not limitation, alert manager 317 is shown in direct communication with K8s containers 306.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
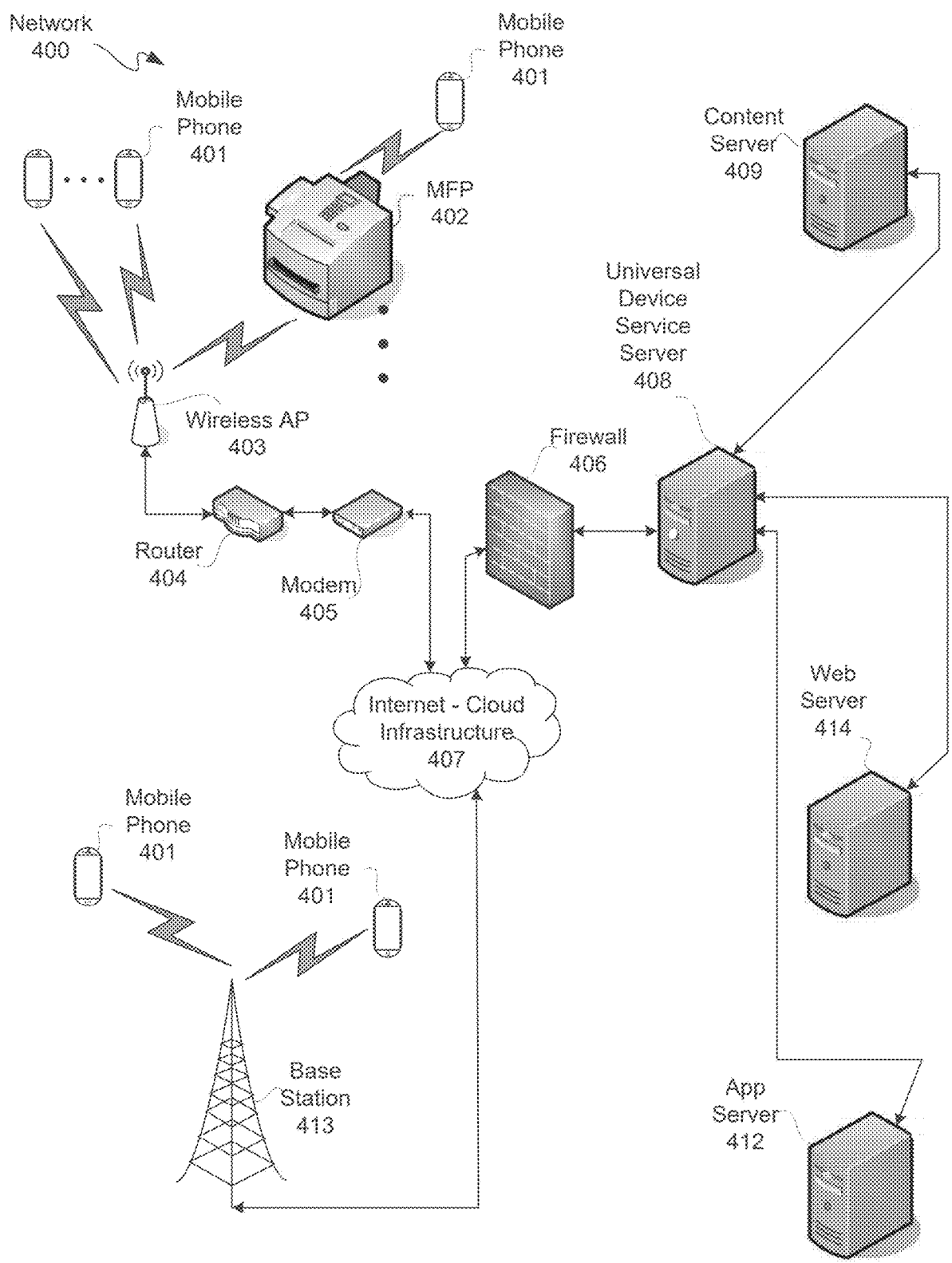
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
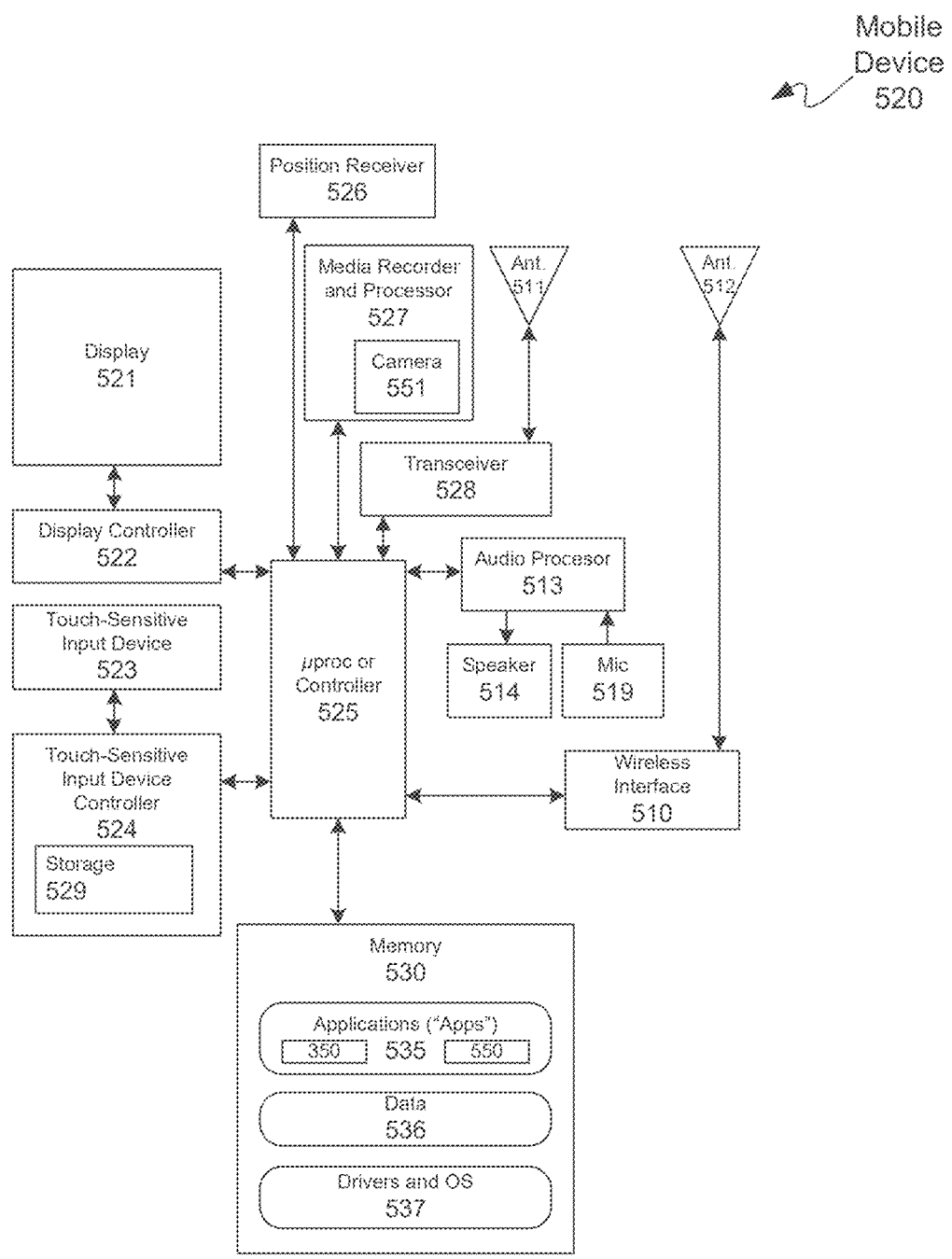
FIG. 5 is a block diagram depicting an example of a portable communication device.

FIG. 5 is a block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps, such as a mobile client application as described hereinabove, may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data. Apps 535 may include an app 550 for a printer driver and may include a VDP client app 350. However, in another example, a printer driver may be included in drivers 537.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
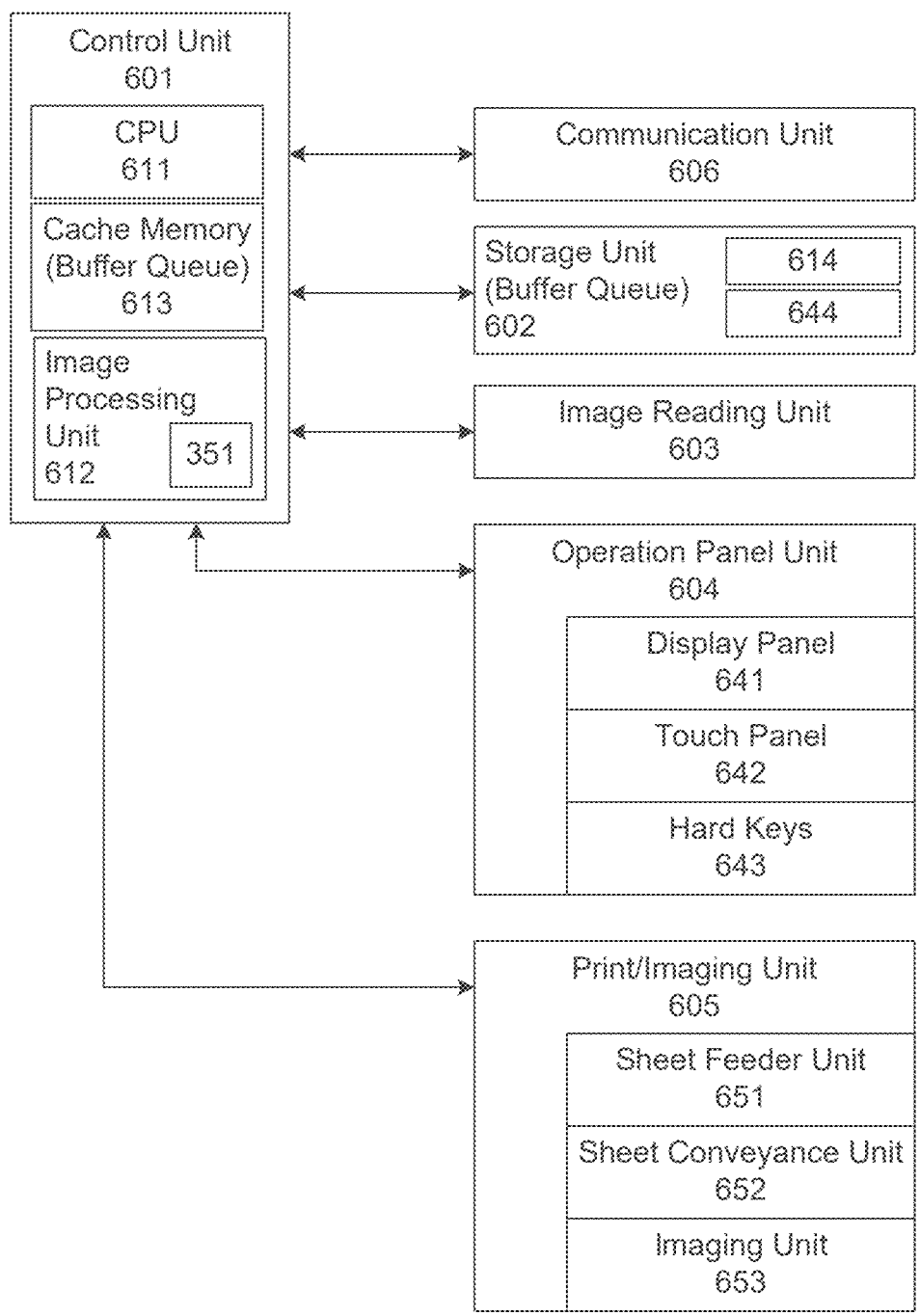
FIG. 6 is a block diagram depicting an example of a multi-function printer (MFP).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Image processing unit 612 may be configured with an imposition service 351, as previously described.

Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and a printer job settings app 644. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
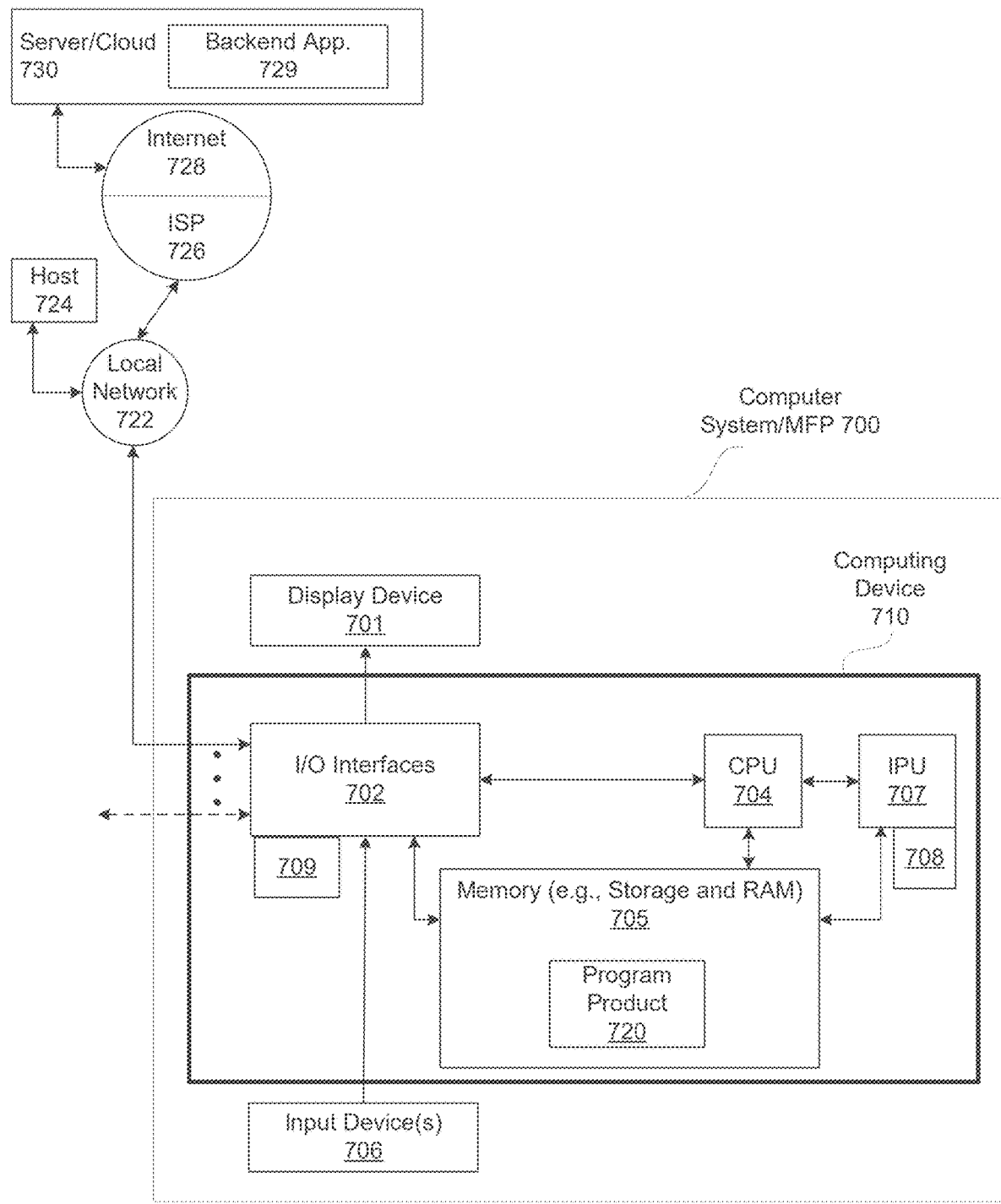
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. For example, program product 720 may include an information and document handling manager for a programmed document server. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VOIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

The invention claimed is:

1. An apparatus for controlled adaptation for real-time dynamic performance enhancement, comprising:
  a document processing system programmed with document services and having a system memory, a data storage, one or more processor units, and a network interface;
  the network interface coupled for receiving user requests for the document services;
  a machine learning model configured with a plurality of nodes and edges therebetween for communication of information;
  the machine learning model configured to allow each of the plurality of nodes to communicate with any other one or more of the plurality of nodes during operation;
  a data process usage node of the plurality of nodes configured to evaluate compression and decompression latency among a plurality of algorithms therefor for the document services responsive to first states from the plurality of nodes;
  a processor usage node of the plurality of nodes configured to evaluate processor unit usage of the one or more processor units responsive to second states from the plurality of nodes;
  a storage usage node of the plurality of nodes configured to evaluate storage usage of the data storage responsive to third states from the plurality of nodes;
  a memory usage node of the plurality of nodes configured to evaluate latency response of the system memory responsive to fourth states from the plurality of nodes; and
  the machine learning model configured as a combination of regression models and a distributed gradient-boosting framework to interactively process the first, second, third, and fourth states for regressions and gradient-boosted decisions to analyze user requested data associated with the user requests to reduce the latency response of the system memory for the controlled adaptation for the real-time dynamic performance enhancement of the document services in the document processing system.

2. The apparatus according to claim 1, wherein the distributed gradient-boosting framework includes at least one gradient-boosting machine.

3. The apparatus according to claim 2, wherein the at least one gradient-boosting machine is a LightGBM.

4. The apparatus according to claim 2, wherein:
  the document processing system is programmed with software services for the document services;
  the software services is configured to control real-time data flow processing by the document processing system for handling of the user requests; and
  the machine learning model is configured to reduce resource usages of the data storage and the one or more processor units subject to a reduction of the latency response.

5. The apparatus according to claim 4, wherein the software services reacts to the user requests for data processing to analyze and update requested documents categorization.

6. The apparatus according to claim 4, wherein the machine learning model and the document services are in communication with one another in a container runtime configured to respond incoming application program interface calls.

7. The apparatus according to claim 6, wherein the container runtime is of a Kubernetes container.

8. The apparatus according to claim 6, wherein the machine learning model is distributed among multiple contain runtimes.

9. The apparatus according to claim 8, wherein the combination of the regression models and the distributed gradient-boosting framework is a LightGBM selected using AutoML automation.

10. The apparatus according to claim 2, wherein the memory usage node includes a leaderboard for memory caching control to adjust for the latency of the system memory responsive to the fourth states from the plurality of nodes.

11. The apparatus according to claim 10, wherein the regressions and gradient-boosted decisions are automatically analyzed for the user requested data associated with the user requests to reduce the latency response of the system memory for the controlled adaptation for the real-time dynamic performance enhancement of the document services to automate the document processing system.

12. An apparatus, comprising:
  a document processing system with a system memory, a data storage, one or more processor units, and a network interface;
  the system memory configured to store program code including document services;
  the network interface coupled for receiving user requests for the document services;
  wherein, in combination and response to executing the program code, the document processing system is configured to initiate operations for implementing a process for controlled adaptation for real-time dynamic performance enhancement, the process including:
  communicating between a plurality of nodes via edges of a machine learning model configured with the plurality of nodes and the edges therebetween for communication of information, wherein the communicating includes communication between each of the plurality of nodes with any other one or more of the plurality of nodes;
  evaluating compression and decompression among a plurality of algorithms responsive to first states from the plurality of nodes by a data process usage node of the plurality of nodes;
  evaluating processor unit usage of the one or more processor units responsive to second states from the plurality of nodes by a processor usage node;
  evaluating storage usage of the data storage responsive to third states from the plurality of nodes by a storage usage node;
  evaluating latency response of the system memory responsive to fourth states from the plurality of nodes by a memory usage node;
  interactively processing the first, second, third, and fourth states for regressions and gradient-boosted decisions by the machine learning model configured as a combination of regression models and a distributed gradient-boosting framework; and analyzing user requested data associated with the user requests to reduce the latency response of the system memory for the controlled adaptation for the real-time dynamic performance enhancement of the document services in the document processing system.

13. The apparatus according to claim 12, wherein the distributed gradient-boosting framework includes at least one gradient-boosting machine.

14. The apparatus according to claim 13, wherein the at least one gradient-boosting machine is a LightGBM.

15. The apparatus according to claim 13, wherein:
the document processing system is programmed with a software services for the document services;
the software services is configured to control real-time data flow processing by the document processing system for handling of the user requests; and
the machine learning model is configured to reduce resource usages of the data storage and the one or more processor units subject to a reduction of the latency response.

16. The apparatus according to claim 15, wherein the software services reacts to the user requests for data processing to analyze and update requested documents categorization.

17. The apparatus according to claim 15, wherein the machine learning model and the document services are in communication with one another in a container runtime configured to respond incoming application program interface calls.

18. The apparatus according to claim 17, wherein the container runtime is of a Kubernetes container.

19. The apparatus according to claim 17, wherein:
the machine learning model is distributed among multiple contain runtimes; and
the combination of the regression models and the distributed gradient-boosting framework is a LightGBM selected using AutoML automation.

20. The apparatus according to claim 13, wherein:
the memory usage node includes a leaderboard for memory caching control to adjust for the latency of the system memory responsive to the fourth states from the plurality of nodes; and
the regressions and gradient-boosted decisions are automatically analyzed for the user requested data associated with the user requests to reduce the latency response of the system memory for the controlled adaptation for the real-time dynamic performance enhancement of the document services to automate the document processing system.

* * * * *